United States Patent [19]
Grossman

[11] Patent Number: 6,140,403
[45] Date of Patent: Oct. 31, 2000

[54] HALOGENATED POLYMER COMPOSITIONS CONTAINING A METAL COMPOUND STABILIZER AND A COATED ACID ABSORBER COSTABILIZER

[75] Inventor: Richard F. Grossman, Wilmington, Del.

[73] Assignee: Hammond Group, Inc., Hammond, Ind.

[21] Appl. No.: 09/489,387

[22] Filed: Jan. 21, 2000

Related U.S. Application Data

[62] Division of application No. 09/360,277, Jul. 26, 1999.
[51] Int. Cl.[7] .............................. B32B 19/00; B32B 19/02
[52] U.S. Cl. ............................................ 524/404; 524/403
[58] Field of Search ...................................... 428/403, 404

[56] References Cited

U.S. PATENT DOCUMENTS

| | | | |
|---|---|---|---|
| 3,846,148 | 11/1974 | Nordyke et al. | 106/308 B |
| 3,852,087 | 12/1974 | Nordyke et al. | 106/288 B |
| 4,221,687 | 9/1980 | Minagawa et al. | 524/114 |
| 5,084,499 | 1/1992 | Todd et al. | 524/414 |
| 5,326,633 | 7/1994 | Clough et al. | 428/403 |
| 5,422,383 | 6/1995 | Takahashi et al. | 428/403 |
| 5,561,182 | 10/1996 | Baker et al. | 524/394 |
| 5,739,188 | 4/1998 | Desai | 524/140 |

*Primary Examiner*—Peter A. Szekely
*Attorney, Agent, or Firm*—Wood, Herron & Evans, L.L.P.

[57] ABSTRACT

Vinyl halide resin compositions containing a metal compound stabilizer and coated acid absorber particles, where the coating consists of a tin-based coating or a complex calcium/zinc/strontium phosphate-based coating, are used to confer heat stability to such compositions. Use of the costabilizers of this invention results in economic advantages and material cost savings.

5 Claims, No Drawings

HALOGENATED POLYMER COMPOSITIONS CONTAINING A METAL COMPOUND STABILIZER AND A COATED ACID ABSORBER COSTABILIZER

This application is a Division of Ser. No. 09/360,277 filed Jul. 26, 1999.

TECHNICAL FIELD OF THE INVENTION

This invention relates to heat stabilizers for halogenated polymers such as polyvinyl chloride (PVC) containing a primary metal stabilizer and a coated acid absorber as costabilizer. The acid absorber costabilizer particles of about submicron to about 10 microns in size are coated with a tin-based coating or a complex calcium/zinc/strontium phosphate-based coating.

BACKGROUND OF THE INVENTION

It is well known that halogenated polymers such as PVC may be heat stabilized by combinations of divalent metal carboxylates and hydrotalcite-like acid absorbers or scavengers. U.S. Pat. Nos. 4,221,687 and 5,084,499 are examples of patents disclosing such stabilizers. It is also known to stabilize vinyl halide resin compositions with mixed metal stabilizers, hydrotalcite and a dialkyltin oxide as disclosed in U.S. Pat. No. 5,561,182. Acid acceptors such as hydrotalcite and zeolite have stabilizer value in PVC and other halogenated polymers. In polymeric matrices, these additives have very little stabilizing effect and are at best secondary stabilizers.

It has been suggested that acid absorbers which are effective as stabilizers form addition complexes at degrading sites, tending to deactivate such sites and to capture catalytic, highly mobile HCl before elimination of further HCl can occur. These stabilizers are believed to have coordinating properties that enable their being at the right place at the right time, at least to a far greater extent than common, acid-reactive fillers.

When used as a primary stabilizer, additives such as hydrotalcite and zeolite (and certain others) provide stability comparable to, for example, barium stearate. In other words, process stability is long, but color hold is poor. This has been corrected in practice by combining these additives with zinc carboxylates. The effect has been to treat the acid absorber as if it were a barium or calcium component of a mixed metal stabilizer. Acid absorber particles coated with zinc carboxylates are useful in flexible PVC compositions where the application has rather modest stabilizer demand, for example, cove base extrusion. These coated acid absorbers are also costabilizers for organotin mercaptides in rigid PVC, and are widely available.

Zeolite or hydrotalcite particles coated with zinc carboxylates are relatively ineffective as costabilizers in a number of significant instances. For instance, in concert with lead stabilizers in flexible PVC, part of the lead stabilizer content may be replaced with such a costabilizer without significant loss of dynamic stability, but with no gain. Since lead stabilizers are highly cost effective, such replacement is of little value. In rigid PVC, partial replacement of lead stabilizer with zinc coated zeolite or hydrotalcite is strongly detrimental to dynamic stability. With "reverse ester" organotins, contrary to the behavior with dialkyltin thioglycolates, zinc coated zeolite or hydrotalcite is almost totally ineffective as a costabilizer with dialkyltin beta-mercaptooleates in rigid PVC compositions. Furthermore, zinc coated zeolite or hydrotalcite is largely ineffective as a costabilizer with organotin carboxylates such as dialkyltin maleates or maleate half esters. In highly filled flexible PVC compositions, such as floor tile, no advantage is found by employing zinc carboxylate coated acid absorbers.

It is believed likely that the zinc carboxylate coating of acid absorber particles functions as a phase transfer catalyst, thereby enabling close coordination to a potential degrading site. However, due to the ineffectiveness of a zinc coated zeolite or hydrotalcite in a number of instances as outlined above, alternative phase transfer catalysts or costabilizers are needed.

SUMMARY OF THE INVENTION

This invention is directed to vinyl halide resin compositions containing a metal compound stabilizer and coated acid absorber particles where the coating consists of a tin-based coating or a complex calcium/zinc/strontium phosphate-based coating to confer heat stability to such compositions.

It has been found that the addition of a tin-based coating to acid absorber particles, such as zeolite and hydrotalcite, enable their performance as costabilizers with economic advantage. For example, zeolite and hydrotalcite particles coated with a dialkyltin oxide and a fatty acid have been found particularly effective with organotin carboxylates as dynamic heat stabilizers. There is also the advantage of material cost savings in partial replacement of the organotin carboxylate with the costabilizer. With reverse ester tins, while there may be little economic advantage in partial replacement with the coated acid absorbers of this invention, the compositions of this invention have been found to provide improved dynamic stability.

In the case of lead stabilzers, acid absorber particles having a complex calcium/zinc/strontium phosphate-based coating have been developed which permit partial replacement of the lead stabilizers with improved dynamic stability. For example, in highly flame retardant, low smoke compositions, the complex coated particles act as a costabilizer with the lead stabilizer to provide improved dynamic stability. These compositions are particularly suitable where the reduction of lead stabilizer is also desired. Furthermore, in flexible PVC compositions for high speed, thin mold extrusion of wire insulation, when it is desirable to use Pb/Ba stearate as a stabilizer, the complex calcium/zinc/strontium phosphate-based coated zeolite particles enable the partial replacement of Pb/Ba stearate with improved stabilizing effectiveness.

DETAILED DESCRIPTION OF THE INVENTION

A. Vinyl Halide Resin

The vinyl halide resin employed is most commonly a homopolymer of vinyl chloride, i.e., polyvinyl chloride. It is to be understood, however, that this invention is not limited to a particular vinyl halide resin such as polyvinyl chloride or its copolymers. Other halogen-containing resins which are employed and which illustrate the principles of this invention include chlorinated polyethylene, chlorosulfonated polyethylene, chlorinated polyvinyl chloride, and other vinyl halide resin types. Vinyl halide resin, as understood herein, and as appreciated in the art, is a common term and is adopted to define those resins or polymers usually derived by polymerization or copolymerization of vinyl monomers including vinyl chloride with or without other comonomers including vinyl chloride with or without other comonomers such as ethylene, propylene, vinyl acetate, vinyl ethers, vinylidene chloride, methacrylate, acrylates, styrene, etc. A simple case is the conversion of vinyl chloride $H_2C$—CHCI to polyvinyl chloride ($CH_2CHCI$—)n wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinate polyethylene, and the like. Of course, the vinyl halide commonly used in the industry is the chloride, although others such as bromide and fluoride may be used. Examples of the latter polymers include polyvinyl bromide, polyvinyl fluoride, and copolymers thereof.

B. Stabilizer System

The coated acid absorbers of this invention are preferably zeolite or hydrotalcite particles coated with either a tin-based coating or a complex calcium/zinc/strontium-based coating. In the case of the tin-based coating, a dialkyltin oxide or a dialkyltin sulfide and a fatty acid are coated onto the zeolite or hydrotalcite particles. The fatty acid is selected from the group consisting of stearic, oleic, octoic and lauric acids. The dialkyltin oxide is preferably a $C_1$–$C_8$ dialkyltin oxide such as dibutyl tin oxide and the fatty acid is most preferably stearic or lauric acid. The acid absorber particles range in size from submicron to about 10 microns. The particles usually comprise about 90–99% by weight of zeolite or hydrotalcite with a coating in an amount of about 1–10% by weight. Other acid absorbers are well known and may be used. The coating usually comprises about 2–5% by weight of the tin-based or complex metal-based component with the balance made up of a fatty acid. The costabilizer is used in a range of about 0.2 to about 3 to 4 phr based on 100 parts of PVC.

A calcium/strontium/zinc complex suitable for use is HALOX SZP-391 which generically is identified as calcium strontium zinc phosphosilicate having a mean particle size of about 2 microns. The theoretical chemical composition in percent by weight is typically 41.9% ZnO, 14.7% CaO, 4.5% SrO, 14.7% $SiO_2$, 17.7% $P_2O_5$ and 5.5% L.O.I. (450° C.). These complexes are manufactured under U.S. Pat. Nos. 3,846,148 or 3,852,087 and these disclosures are incorporated herein by reference.

The coated acid absorber particles, such as zeolite and hydrotalcite, are coated by adding the particles either to a ribbon blender or sigma blade mixer. While the batch is rotating, the fatty acid and metal-based ingredients are metered in, generally over a period of several minutes. Blending is then maintained for 5–15 additional minutes prior to discharge. More intensive blenders, such as Henschel or Littleford mixers, may also be used.

Metal compound heat stabilizers in vinyl halide resin. compositions are well known. The metal compound stabilizer is normally used in an amount of about 0.5 to 5 parts of PVC. As developed in the background of this invention, these metal compounds serve to capture HCI liberated during heat processing of the vinyl halide resin composition into its final shape. Metal salts and mixed metal salts are employed as heat stabilizing compositions. The metal component can be a barium, cadmium, calcium, zinc, strontium, tin, lead, or antimony salt. Usually metal salts of a carboxylic acid, advantageously of a $C_8$–$C_{24}$ monocarboxylic acid, such as lauric, oleic, stearic, octoic, or similar fatty acid salts are used. Salts of such acids, and their preparation, are familiar to those skilled in the art to which this present invention pertains.

The metal compound stabilizers with which the coated acid absorber costabilizers are employed may be selected from a wide variety of stabilizers. In particular, as stated above, reverse ester tins and tin carboxylates are employed with economic advantage and/or improved dynamic stability with the coated acid absorbers as costabilizers. Such organotin stabilizers comprise several classes of compounds. The commercial products include blends of dialkyltin bis (iso-thioglycolates) with monoalkyltin tris(iso-thioglycolates), referred to as "tin mercaptides." Similar blends of dialkyltin bis(2-mercaptoethyl oleates), referred to as "reverse ester tins" in the trade, are employed. Other organotin stabilizers include dialkytin carboxylate esters, of which the most common are dialkytin maleate esters such as dialkyltin maleate octoate. Lead stabilizers such as lead stearate, barium stearate, and mixtures thereof, can be employed as the primary metal compound stabilizer. Others include dibasic lead phthalate, tetrabasic lead fumarate, dibasic lead phosphite, and the like. Other antimony, barium, calcium, cadmium, zinc, lead, strontium, and tin metal compound stabilizers may be employed in view of the teachings of this invention as understood by a person of ordinary skill in the art in view of the detailed description.

The following examples illustrate the practice of this invention. These examples are not considered to be limiting upon the scope of the invention.

A series of examples 1–5 were performed to illustrate the practice of the invention with zeolite acid absorber particles coated with stearic acid plus a complex calcium/zinc/strontium phosphate, identified above.

The test vinyl halide resin composition comprised the following components in parts per 100 parts resin (phr):

| | |
|---|---|
| Geon 30 PVC | 100 |
| Santicizer 2148 plasticizer | 27 |
| Great Lakes CP45 brominated flame retardant | 20 |
| Aluminum trihydrate | 20 |
| Magnesium hydroxide | 5 |
| Zinc borate | 10 |
| Ammonium octamolybdate (AOM) | 10 |
| Antimony oxide | 3 |
| Stearic acid | 0.3 |
| Paraffin wax | 0.3 |

Santicizer 2148 is an "aryl alkyl phosphate" plasticizer supplied by Monsanto. CP45 is a proprietary polybrominated organic flame retardant from Great Lakes Chemical.

Dynamic stabilities of the Examples 1–5 compositions containing the stabilizers identified in the following Table 1 was determined using a Brabender PL-2000 Torque Rheometer using an electrically heated, Type 6, 3-piece head. Samples were removed periodically with square, long-nosed pliers and failure times were at 200° C., 120 rpm with a 70 grams batch. Examples 4 and 5 employed "Halstab 1219" costabilizer to identify the inventive acid absorber particles (about 1–5 microns) of 95% zeolite coated with 3% stearic acid plus 2% of a complex calcium/zinc/strontium phosphate (HALOX 52P-391). Examples 4 and 5 containing Halstab 1219 far out performed Examples 1–3 which employed the lead metal stabilizers alone. Thus, Examples 1–5 illustrate the partial replacement of common lead stabilizers with the inventive costabilizers thereby yielding improved dynamic stability. Furthermore, highly flame retardant, low smoke compositions as exemplified by Examples 1–5 may be formulated where additives are needed for FR/LS (Flame Resistant/Low Smoke) properties without detracting from stability.

TABLE 1

| Example No. | Stabilizer | phr | Failure Time (minutes) |
|---|---|---|---|
| 1 | Dibasic lead phthalate | 6 | 38 |
| 2 | Dibasic lead phthalate | 8 | 46 |
| 3 | Dibasic lead phthalate | 6 | 54 |
|   | Tetrabasic lead fumarate | 2 |   |
| 4 | Dibasic lead phthalate | 6 | 82 |
|   | Halstab 1219 | 2 |   |
| 5 | Dibasic lead phthalate | 4 | 101 |
|   | Dibasic lead phosphite | 2 |   |
|   | Halstab 1219 | 2 |   |

Examples 6–8 of Table 2 further illustrate the use of coated acid absorbers as partial replacements for lead stabilizers. In these cases, a Pb/Ba stearate was employed as the primary stabilizer, and Examples 7–8 used a partial substitution with Halstab 1219 which is the complex coated costabilizer identified above. The flexible PVC compositions were formulated for high speed, thin wall extrusion of wire insulation. In such cases it is desirable to use a Pb/Ba stearate as the stabilizer because of its combination of lubrication value and solubility in PVC of both the stabilizer and its primary reaction product, basic lead chloride. Stabilization effectiveness, however, is in itself not comparable to, for example, dibasic lead phthalate. In these examples, the test compound comprised (phr):

| | |
|---|---|
| Geon 30 PVC | 100 |
| Ditridecyl Phthalate | 30 |
| Tris-iso-nonyl trimellitate | 20 |
| $CaCO_3$ | 5 |
| Calcined clay | 12 |
| Antimony oxide | 2 |

Dynamic stabilities were determined as in the foregoing examples and the failure times were observed at 190° C., 100 rpm for a 65 grams batch, as noted in the following Table 2. As demonstrated by Examples 6–8, the coated acid absorber costabilizer of this invention may be substituted for lead stabilizers with significant improvements in heat stabilities and color hold.

TABLE 2

| Example No. | Stabilizer | phr | Failure Time (minutes) |
|---|---|---|---|
| 6 | Halstab BA-1 (Pb/Ba stearate) | 2 | 64 |
| 7 | Halstab BA-1 | 1.5 | >100 |
|   | Halstab 1219 | 0.5 |   |
| 8 | Halstab BA-1 | 1.3 | >100+ |
|   | Dibasic lead phthalate | 0.2 | excellent |
|   | Halstab 1219 | 0.5 | color hold |

Examples 9–12 demonstrate the use of acid absorber particles as a costabilizer for reverse tins and tin carboxylates. "Halstab 1214" identifies the costabilizer which comprises 95% zeolite particles coated with 2% dibutyltin oxide and 3% stearic acid. The test composition included the following components (phr):

| | |
|---|---|
| Oxy 220 PVC | 100 |
| $CaCO_3$ | 20 |
| Paraloid K334 | 6 |
| Paraloid K120N | 1.2 |
| Paraloid K175 | 0.3 |
| Calcium Stearate | 1.3 |
| Paraffin wax | 1 |
| AC629A PE | 0.2 |
| Loxiol G33 | 0.3 |

Paraloid K334 is an elastomeric acrylic impact modifier; K120N, a processing aid; and K-175, a lubricating processing aid, all from Rohm & Haas. AC629A is partly oxidized low MW polyethylene from Allied Signal, and Loxiol G-33, a complex ester lubricant from Henkel.

Morton TM 694 reverse ester tin is a proprietary blend of dimethyltin bis (2-mercapto-ethyl oleate) and monomethyltin tris (2-mercaptoethyl oleate). Akcros T878M maleate ester is a proprietary half ester of dibutyltin maleate laurate. They were employed as the primary stabilizers with Halstab 1214 costabilizer. With reference to Table 3 for Examples 9–12, it has been demonstrated that the use of the coated acid absorbers as costabilizers for reverse ester tins enables their partial replacement to provide improved dynamic stabilities. In the case of the organotin carboxylate, there is also the advantage of material cost savings with partial replacement by the costabilizer.

TABLE 3

| Example No. | Stabilizer | phr | Failure Time (minutes) |
|---|---|---|---|
| 9 | Morton TM694 reverse ester tin | 2 | 31 |
| 10 | Morton TM694 | 1 | 44 |
|   | Halstab 1214 | 1 |   |
| 11 | Akcros T878M (maleate ester) | 2.5 | 27 |
| 12 | Akcros T878M | 1.25 | 38 |
|   | Halstab 1214 | 1 |   |

Examples 13–16 were performed in order to determine the effect of the stabilizer and costabilizer in a pipe formulation as follows (phr):

| | |
|---|---|
| PVC | 100 |
| $CaCO_3$ | 5 |
| $TiO_2$ | 1 |
| Paraloid K120N | 0.5 |
| Calcium stearate | 0.5 |
| Paraffin wax | 1.2 |

Dynamic stabilities were again determined at 190° C., 60 rpm, for a 65 grams batch, with the results reported in the following Table 4. Ferro S1027 is antimony tris(isobutyl thioglycolate).

TABLE 4

| Example No. | Stabilizer | phr | Failure Time (minutes) |
|---|---|---|---|
| 13 | Morton TM694 | 0.4 | 17 |
| 14 | Morton TM694 | 0.25 | 27 |
|   | Halstab 1214 | | |

TABLE 4-continued

| Example No. | Stabilizer | phr | Failure Time (minutes) |
|---|---|---|---|
| 15 | Ferro S1027 | 0.4 | 15 |
| 16 | Ferro S1027 | 0.25 | 25 |
|  | Halstab 1214 | 0.25 |  |

With reference to the above Table 4, replacement of the primary tin or antimony stabilizer with the coated acid absorber costabilizer provided improved dynamic stabilities.

Applications were also demonstrated in flexible PVC. Examples 17–21 were performed with Halstab 1219 and Halstab 1214, alone, and in combination with organotin carboxylates and reverse ester tins. Again, dynamic stabilities were determined at 190° C., 90 rpm for the 65 grams batch on the following test composition (phr):

| | |
|---|---|
| Oxy 220 PVC | 100 parts |
| $CaCO_3$ | 10 parts |
| 911 P plasticizer (a blend of straight chain 9 and 11 crabon phthalates) | 45 parts |

With reference to Table 5 for Examples 17–21, improved dynamic stabilities were achieved with good or excellent color hold in the case of the stabilizer compositions of this invention. Thus, with reference to Example 21, the effectiveness in flexible PVC with 1–1.5 parts costabilizer with as little as 0.2–0.3 parts tin stabilizer makes these stabilizer compositions highly cost effective versus mixed metal systems. Also, in clear semirigid PVC (15 phr plasticizer), excellent dynamic stability is achieved using 0.7 to 1 phr costabilizer plus 0.3 to 0.5 phr of a tin maleate, Akcros T878, and the stabilizer system is odorless.

TABLE 5

| Example No. | Stabilizer | phr | Failure Time (minutes) | Color Hold |
|---|---|---|---|---|
| 17 | Halstab 1219 | 2.5 | >60 | poor |
| 18 | Halstab 1214 | 2.5 | >60 | poor |
| 19 | Halstab 1214 | 1.25 | >60 | good |
|  | Morton TM694 | 1.25 |  |  |
| 20 | Halstab 1219 | 1.25 | >60 | good |
|  | Morton TM694 | 1.25 |  |  |
| 21 | Halstab 1214 | 1.25 | >120 | excellent |
|  | Akcros T186 | 0.3 |  |  |

Examples 22–23 were performed in order to evaluate the inventive stabilizers in highly filled compounds. The following formulation was used (phr):

| | |
|---|---|
| Oxy 220 PVC | 100 |
| $CaCO_3$ | 100 |
| Clay | 200 |
| Di-isodecyl phthalate | 75 |

Dynamic stabilities were determined at 190° C., 90 rpm for a 60 grams batch. The results are reported in the following table. "Halstab 1218" identifies the costabilizer of hydrotalcite particles coated with 2% dibutyltin oxide and 3% stearic acid.

TABLE 6

| Example No. | Stabilizer | phr | Color Hold (minutes) |
|---|---|---|---|
| 22 | Ba/Zn liquid Mark 4702 (Witco) | 2.5 | discoloration after 15–20 |
| 23 | Halstab 1218 | 1.25 | no discoloration after 60 |
|  | Morton TM-694 | 1.25 |  |

The high efficiency Ba/Zn liquid stabilizer of Example 22 after 15–20 minutes at 190° C., 90 rpm for a 75, grams batch. In contrast, the tin stabilizer and costabilizer composition of this invention exhibited no discoloration after 60 minutes.

Examples 24–33 were performed to demonstrate various features of the costabilizers of this invention upon comparison with other stabilizers. Organotin stabilizers were used as the primary stabilizer from several classes. The commercial products include Morton TM-181 blends of dialkyltin bis(iso-thioglycolates) with monoalkyltin tris(iso-thioglycolates) which are generally referred to as "tin mercaptides." For comparison, Morton TM-694 is a blend of dialkyltin bis(2-mercaptoethyl oleates) identified above, referred to as "reverse ester tins." Ackros T-878M is a dialkyltin carboxylate ester, identified above. These three classes of organotin stabilizers were tested in the following test composition (phr):

| | |
|---|---|
| PVC | 100 |
| $CaCO_3$ | 5 |
| $TiO_2$ | 1 |
| Calcium Stearate | 1.5 |
| Paraffin wax | 0.5 |
| Rohm & Haas K334 acrylic impact modifier | 5 |
| Rohm & Haas K120N processing aid | 1 |

Dynamic stabilities were again determined at 190° C., 60 rpm, for a 65 grams batch.

With reference to Table 7, it may be concluded, as is widely known, that zinc-zeolite costabilizers are effective only with organotin stabilizers of the tin mercaptide type with reference to Examples 24–31. In complete contrast, the new costabilizer of this invention, where the acid absorber particles of zeolite are coated with a blend of dialkytin oxide, is effective with the reverse ester tins and tin carboxylate esters, as demonstrated by Examples 32–33. Examples 32–33 demonstrated at every stage that the stabilizer compositions of this invention showed less discoloration and extended heat stabilities by comparison with other zinc-zeolite costabilizers.

In Table 7, PQ Corp Valfor 100 is comprised of 90% zeolite and 10% zinc stearate and Halstab 1131 is comprised of 90% zeolite and 10% zinc stearate. "Halstab 1214" identifies the costabilizer of 95% zeolite particles coated with 1.7% dibutyltin oxide and 3.3% stearic acid. "Halstab 1215" identifies the costabilizer of 93% zeolite particles coated with 3% dioctyltin oxide and 4% lauric acid.

TABLE 7

| Example No. | Stabilizer | phr | Failure Time (minutes) |
|---|---|---|---|
| 24 | Morton TM-181 | 1.2 | 35 |
| 25 | Morton TM-181 | .6 | 35 |
|    | Valfor 100 | .6 | |
| 26 | Morton TM-694 | 2 | 40 |
|    | Valfor 100 | .6 | |
| 27 | Morton-694 | 1 | 18 |
|    | Halstab 1131 | 1 | |
|    | Valfor 100 | .6 | |
| 28 | Morton TM-694 | 1 | 18 |
|    | Valfor 100 | .6 | |
| 29 | Akcros T-878M | 2.5 | 20 |
| 30 | Akcros T-878M | 1.25 | 12 |
|    | Halstab 1131 | 1.25 | |
| 31 | Akcros T-878M | 1.25 | 12 |
| 32 | Morton TM-694 | 1 | 40 |
|    | Halstab 1214 | 1 | |
|    | Valfor 100 | .6 | |
| 33 | Akcros T-878M | 1.25 | 35 |
|    | Halstab 1215 | 1.25 | |

The costabilizers of this invention are also effective with mixed metal systems but organo phosphite costabilizers must be omitted because they react with dialkyltin oxides or sulfides to form phosphates or thiophosphates. Organosulfur costabilizers such as dilauryl thioproionate (DLTDP) may be used instead of organophosphites in these systems.

Having described this invention, its advantages and parameters, it will be obvious to a person of ordinary skill in the art, in view of the above description, that variations thereof may be made without departing from the spirit and scope thereof.

What is claimed is:

1. A composition comprising acid absorber particles having a coating selected from the group consisting of an organotin-based coating and a complex calcium/zinc/strontium phosphate-based coating.

2. The composition of claim 1 wherein said acid absorber is selected from the group consisting of zeolite and hydrotalcite.

3. The composition of claim 1 wherein said organotin-based coating contains a fatty acid and an organotin selected from the group consisting of a dialkyltin oxide and dialkyltin sulfide.

4. The composition of claim 3 wherein said fatty acid is selected from the group consisting of stearic, oleic, octoic and lauric acids.

5. The composition of claim 1 wherein said particles are sized in the range of about submicron to about 10 microns.

* * * * *

UNITED STATES PATENT AND TRADEMARK OFFICE
CERTIFICATE OF CORRECTION

PATENT NO. : 6,140,403
DATED : October 31, 2000
INVENTOR(S) : Richard F. Grossman It is certified that error appears in the above-identified patent and that said Letters Patent is hereby corrected as shown below:

Title page,
Item [54], the title should read -- COATED ACID ABSORBER PARTICLES USEFUL AS COSTABILIZERS IN HALOGENATED POLYMER COMPOSITIONS --

Column 1,
Lines 34 and 25, "HCI" should read -- HCl --

Column 3,
Line 3, "$H_2C$ — CHCI" should read -- $H_2C$ — CHCl --
    and "$CH_2$ — CHCI" should read -- $CH_2$ — CHCl --

Column 5,
TABLE, Examples Nos. 3, 4, and 5
"3  Dibasic lead phthlate      6   54    should read  --3  Dibasic lead phthlate      6
    Tetrabasic lead fumarate   2                         Tetrabasic lead fumarate   2   54
 4  Dibasic lead phthalate     6   82                 4  Dibasic lead phthalate     6
    Halstab 1219               2                         Halstab 1219               2   82
 5  Dibasic lead phthalate     4   101                5  Dibasic lead phthalate     4
    Dibasic lead phosphite     2                         Dibasic lead phosphite     2
    Halstab 1219               2    "                    Halstab 1219               2   101 --
TABLE 2, Example No. 7
"7  Halstab BA      1.5   >100    should read   -- 7  Halstab BA-1    1.5
    Halstab 1219    0.5    "                         Halstab 1219    0.5   >100 --

Column 6,
TABLE 3, Examples Nos. 10 and 12
"10 Morton TM694     1      44   should read -- 10 Morton TM694     1
    Halstab 1214     1                             Halstab 1214     1     44
 11 Akcros T878M     2.5   27                   11 Akcros T878M     2.5   27
    (Maleate ester)                                (Maleate ester)
 12 Akcros T878M     1.25  38                   12 Akcros T878M     1.25
    Halstab 12141           "                      Halstab 1214     1     38 --

Column 6 and 7,
TABLE 4, Examples Nos. 14 and 16
"14 Morton TM694     0.25  27  should read -- 14 Morton TM694     0.25
    Halstab 1214                                  Halstab 1214           27
 15 Ferro S1027      0.4   15                 15 Ferro S1027      0.4    15
 16 Ferro S1027      0.25  25                 16 Ferro S1027      0.25
    Halstab 1214     0.25   "                    Halstab 1214     0.25   25 --

UNITED STATES PATENT AND TRADEMARK OFFICE
CERTIFICATE OF CORRECTION

PATENT NO.   : 6,140,403
DATED        : October 31, 2000
INVENTOR(S)  : Richard F. Grossman It is certified that error appears in the above-identified patent and that said Letters Patent is hereby corrected as shown below:

Column 7,
Line 25, "11 crabon" should read -- 11 carbon --
TABLE 5, Examples Nos. 19, 20 and 21
"19  Halstab 1214   1.25  >60 good   should read -- 19 Halstab 1214   1.25
    Morton TM694 1.25                              Morton TM694  1.25 >60 good
 20 Halstab 1219    1.25  >60 good              20 Halstab 1219    1.25
    Morton TM694 1.25                              Morton TM694  1.25 >60good
 21 Halstab 1214    1.25  >120                  21 Halstab 1214    1.25
                          excellent                Akcros T186    0.3  >120
    Akcros T186   0.3                                                  excellent --

Signed and Sealed this

Eleventh Day of December, 2001

Attest:

NICHOLAS P. GODICI
Attesting Officer    Acting Director of the United States Patent and Trademark Office